United States Patent [19]

Ellis et al.

[11] 4,133,132
[45] Jan. 9, 1979

[54] PLUG-CUT HERRING PROTECTOR

[76] Inventors: Cadwalader H. Ellis, 2621 37th Ave. West, Seattle, Wash. 98199; Arthur K. Ellis, 214 S. 31st Ave., Yakima, Wash. 98902

[21] Appl. No.: 781,843

[22] Filed: Mar. 28, 1977

[51] Int. Cl.² ............................................... A01K 97/00
[52] U.S. Cl. ........................................... 43/41; 43/44.4
[58] Field of Search ................... 43/41, 41.2, 42.22, 43/42.23, 44.2, 44.4

[56] References Cited

U.S. PATENT DOCUMENTS

| | | | |
|---|---|---|---|
| 2,294,081 | 8/1942 | Fairfax | 43/42.22 |
| 2,518,593 | 8/1950 | Bell | 43/44.2 |
| 2,582,646 | 1/1952 | Moore | 43/41 X |
| 2,763,086 | 9/1956 | Johnson | 43/44.2 |
| 2,931,123 | 4/1960 | Jensen | 43/41 |
| 2,939,241 | 6/1960 | Hicks | 43/41 |
| 3,645,031 | 2/1972 | Egles | 43/44.2 |

Primary Examiner—Nicholas P. Gudici
Attorney, Agent, or Firm—Seed, Berry, Vernon & Baynham

[57] ABSTRACT

A protector for covering the front face of a "plug-cut herring" to maintain the front face of the plug at a predetermined angle. The protector is basically a cap having a planar face and a cylindrical wall adapted to extend rearwardly along the sides of the herring when the inside surface of the cap member abuts the front face of the herring. A pair of spaced apart apertures are formed in the face of the cover for allowing a leader terminating in a pair of hooks to extend through the cover. The speed at which the herring oscillates as it is towed through the water is determined by which of the two apertures the leader passes. The plug-cut herring protector may be formed of a wide variety of materials and colors and it may be fabricated in a variety of sizes to accommodate a wide range of plug sizes.

3 Claims, 4 Drawing Figures

PLUG-CUT HERRING PROTECTOR

BACKGROUND OF THE INVENTION

1. Field of the Invention

This invention relates to fishing bait, and, more particularly, to a device for protecting the front face of a plug-cut herring.

2. Description of the Prior Art

A common and highly effective fishing bait is formed by severing the head of a herring at a predetermined angle, and then threading the resulting plug with a leader terminating in a single hook or a pair of hooks imbedded in the body of the plug. The head is severed so that the front face of the plug lies along a plane which intersects the longitudinal axis of the herring at 45° when viewed from both the top and side. This particular angle of cut causes the plug to resemble the swimming motion of a wounded fish as the plug is towed through the water. A particular problem with the use of plug-cut herring is that the front face of the plug quickly becomes deformed and begins to separate. Initially the only problem encountered with this deformation is that the plug no longer resembles the actual motion of a wounded fish with any degree of accuracy. Subsequently, however, as the plug begins to separate and desintegrate the plug tends to become easily detached from the leader. Consequently, plug-cut herring as conventionally used effectively simulates a live wounded fish for only a limited period of time, and the plug is easily detached from the leader.

Although bait protectors which cover or enclose the forward portion of bait are in conventional use, these protectors are not provided for the purpose of maintaining a predetermined shape of the bait but rather to either support a hook within the bait or to maintain the gills and mouth of a whole fish closed in order to keep it from being deformed.

SUMMARY OF THE INVENTION

It is an object of the invention to provide a planar face for a plug-cut herring which intersects the horizontal and vertical planes of the plug-cut herring at a precisely selected angle.

It is another object of the invention to preserve the planar nature of the front face so that the front face does not rapidly become distorted during use.

It is still another object of the invention to reduce the rate at which a plug-cut herring deteriorates during use in order to increase the period during which the plug-cut herring is securely fastened to a fishing leader and to maintain the proper face with resulting proper bait action.

These and other objects of the invention are accomplished by a protector for covering the front face of a plug-cut herring. The protector has a planar cover member having a shape corresponding to the shape of the front face of the plug-cut herring when viewed at a point perpendicular to the front face. The cover member is surrounded by a sidewall which extends rearwardly along the outside of the plug-cut herring parallel to its longitudinal axis when the inside face of the cover member flushly contacts the front face of the plug-cut herring. The face of the cover member preferably has a pair of apertures formed therein on opposite sides of the vertical center line. The action of the plug-cut herring as it is towed through water may then be adjusted by selecting through which of the two apertures a fishing leader passes before extending rearwardly and terminating in at least one hook imbedded in the plug-cut herring. The cover member is fastened to the plug-cut herring by inserting retaining pins into the plug-cut herring through the pair of apertures in the sidewalls on opposite sides of the cover member.

DETAILED DESCRIPTION OF THE INVENTION

Figure 1:
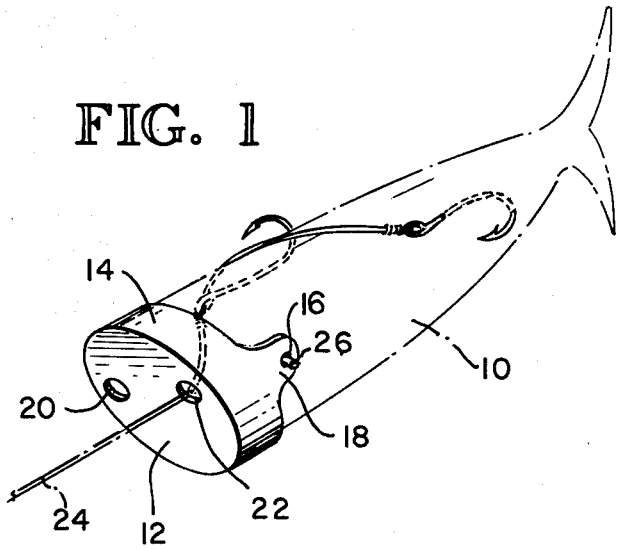
FIG. 1 is an isometric view of the protector installed on a plug-cut herring.
Figure 2:
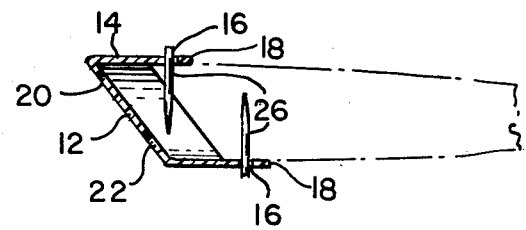
FIG. 2 is a top plan view of the protector as installed on a plug-cut herring.
Figure 3:
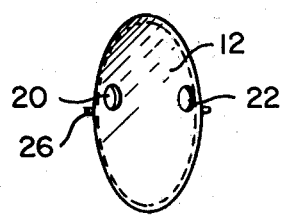
FIG. 3 is a front elevational view of the protector.
Figure 4:
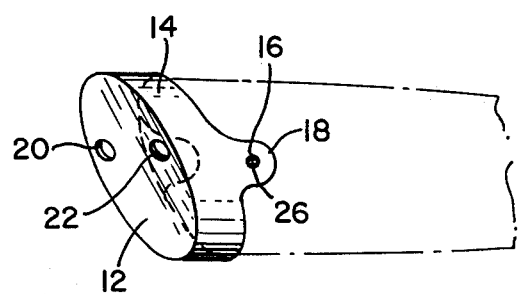
FIG. 4 is a side elevational view of the protector installed on a plug-cut herring.

A plug-cut herring is prepared by severing the head of a herring at an angle of 45° with respect to both a horizontal and vertical plane. In conventional use a leader terminating in one or more hooks is then threaded through the plug-cut herring in the manner illustrated in FIG. 1. When the plug-cut herring is towed through the water the particular angle along which the head is severed produces an action which accurately resembles a live wounded herring swimming through the water.

The plug-cut herring protector of the present invention as illustrated in the drawings is adapted to cover the front face of the plug-cut herring in order to prevent deterioration of the plug-cut herring which would alter the shape of its front face and allow deterioration of proper plug action as well as allow the hook to be more easily separated from the plug-cut herring. The protector includes a cover member 12 having a shape corresponding to the shape of the front face of the plug-cut herring when viewed from a perpendicular to the front face. A wall 14 extends around the cover member 12. The wall 14 intersects the cover member 12 at a variable angle so that the wall 14 may extend along the outside of the plug-cut herring parallel to the axis of the plug-cut herring while the inside face of the cover member 12 flushly contacts the front face of the plug-cut herring. Consequently, the wall 14 intersects the cover member 12 at 45° at the top of the cover member 12 and at 135° at the bottom end of the cover member 12. Similarly, the wall 14 intersects the cover member 12 on the right side of the cover member 12 at 45° and on the left side of the cover member 12 at 135°. Although it is not necessary for the inside surface of the wall 14 to tightly contact the outside of the plug-cut herring 10, the cover member 12 should be approximately the same size as the front face of the plug-cut herring 10. Since varying size of plug-cut herring are generally used the protector of the present invention is preferably manufactured in a wide variety of sizes.

The cover member 12 is fastened to the plug-cut herring 10 by inserting two retaining pins 26 through apertures 16 in a pair of ears 18 extending rearwardly from the wall 14 on opposite sides thereof so that the retaining pins pierce the flesh of the plug-cut herring 10.

The cover member 12 contains a pair of spaced apart apertures 20,22 adapted to allow a fishing leader 24 to pass rearwardly through the cover member 12 into the flesh of the plug-cut herring 10. Passing the leader 24 through the forwardmost aperture 20 causes the plug-cut herring 10 to oscillate at a relatively slow rate as the plug-cut herring 10 is towed through a body of water. Passing the leader 24 through the rearmost aperture 22 causes the plug-cut herring 10 to oscillate at a relatively high speed as the leader 24 tows the plug-cut herring 10 through a body of water. The speed of the action selected will, of course, depend upon which is most effective for the given species of fish. For example, it has been found that the relatively fast action provided by passing the leader 24 through the rearmost hole 22 is most effective for catching coho salmon while passing the leader 24 through the forward hole 20 is most effective for catching chinook salmon.

Since the wall 14 of the protector is maintained in parallel relationship to the axis of the plug-cut herring 10, the front face of the cover member 12, which effectively becomes the front face of the plug-cut herring 10, always intersects vertical and horizontal longitudinal planes of the plug-cut herring 10 at the optimum angle, regardless of how long it is used. The walls 14 lightly compress the forward end of the plug-cut herring 10 to prevent the flesh of the plug-cut herring from deforming with use so that the leader 24 is securely fastened to the plug-cut herring 10 for a greater period of time. The protector can be manufactured in a variety of colors from a variety of materials by a wide range of techniques.

The cover also permits use of a plug-cut herring without need for eviserating the herring; this is of additional value as the encapped viscera leaves a trailing scent path that is attractive to the fish for which the angling is being conducted.

We claim:

1. A protector for covering the angularly cut face of a plug-cut herring, comprising a planar cover member having a shape corresponding to the shape of the front face of said plug-cut herring, said cover member being surrounded by a relatively narrow wall intersecting said cover member at first and second sides of said cover member at approximately 45° and 135°, respectively, and at the top and bottom of said cover member at approximately 45° and 135°, respectively, such that the inside face of said cover member is adapted to flushly contact the angularly cut face of said plug-cut herring when said wall extends rearwardly a relatively short distance along the outside of said plug-cut herring parallel to the longitudinal axis of said plug-cut herring so that said wall does not unduly cover the body flesh of said herring, said cover member having an aperture formed therein adapted to allow a fishing leader and hooks to freely pass rearwardly through said cover member into said plug-cut herring, and securing means for fastening said cover member to said plug-cut herring such that the cut front face of said herring facilitates dispersal of the scent from the retained viscera of said herring and said protector, while occupying a relatively small portion of the bait length, prevents deterioration of the cut front face of said herring while allowing said fishing leader and hooks to pass directly and freely into said herring.

2. The protector of claim 1, wherein said securing means comprise a pair of apertures in said wall on opposite sides thereof and a retaining pin adapted for insertion through said apertures and said plug-cut herring.

3. The protector of claim 1, wherein a pair of spaced apart apertures are formed in the front face of said cover member on opposite sides thereof such that the action of said plug-cut herring when towed through water can be altered by selecting through which of said apertures said fishing leader and hooks pass.

* * * * *